Jan. 12, 1960 A. W. BULL 2,920,674
METHOD OF AND APPARATUS FOR RECORDING INFORMATION
ON A PNEUMATIC TIRE AND PRODUCT OBTAINED THEREBY
Filed Dec. 9, 1958 3 Sheets-Sheet 1

*INVENTOR.*
ARTHUR W. BULL
BY Irwin M. Lewis
ATTORNEY.

Jan. 12, 1960  A. W. BULL  2,920,674
METHOD OF AND APPARATUS FOR RECORDING INFORMATION
ON A PNEUMATIC TIRE AND PRODUCT OBTAINED THEREBY
Filed Dec. 9, 1958  3 Sheets-Sheet 2

INVENTOR.
ARTHUR W. BULL
BY Irwin M. Lewis
ATTORNEY.

United States Patent Office 2,920,674
Patented Jan. 12, 1960

2,920,674

METHOD OF AND APPARATUS FOR RECORDING INFORMATION ON A PNEUMATIC TIRE AND PRODUCT OBTAINED THEREBY

Arthur W. Bull, Grosse Pointe, Mich., assignor to United States Rubber Company, New York, N.Y., a corporation of New Jersey Application December 9, 1958, Serial No. 779,242

12 Claims. (Cl. 152—361)

This invention relates to pneumatic rubber tires having structural or reinforcing components such as bead wires, breakers, body plies, or flippers and the like, comprising ferrous metal or other magnetizable material. More particularly the invention relates to a method of permanently recording information relating to the tire directly thereon by magnetizing at least one of the structural or reinforcing components in an indicia forming pattern to provide said information thereon in code form.

Briefly, the invention comprises magnetizing such magnetizable reinforcing components of the tire in a predetermined pattern in accordance with a code of the information desired to be recorded. The components are magnetized by either permanent magnets or electromagnets. The use of electro-magnets is preferred because they can be turned on or off at will. The components may be magnetized either before, during, or after curing of the tire. Also, if desired, the components may be magnetized before they are built into the tire.

Once the magnetizable components have been magnetized, they will retain the magnetism almost indefinitely and the magnetically recorded information may be transcribed at any time. The information can be simply transcribed from the tire by moving a magnetic compass along the magnetized component and noting the deflection of the compass needle. However, a more preferred method is to rotate the tire at a fixed speed while holding a pickup coil close to the tire during rotation so that a varying electrical current is induced in the coil in accordance with the magnetic pattern on the components. The varying current so induced is fed to a suitable indicating or recording device.

Various information can be so recorded on the tire and the recorded information can be used in various ways. For example, the information so recorded on the tire may be used to indicate special tires to facilitate following these tires through production. The information so recorded can be used to sort finished tires by size, brand, or special code numbers, or to provide a serial code to supplement or replace standard serial codes. The information so recorded can also be used for screening tires to be sure that all tires in a shipment, supposedly of one type, are in fact of that type, and can be used for indicating balancing points on tires and to indicate the amount of balancing dough needed at the particular point.

An advantage of the present invention over conventional methods of recording information on tires, viz. by molding the information thereon or by writing the information thereon with a crayon is that there is neither a permanent nor non-permanent defacing of the tire. The information is invisible and accordingly does not detract from the appearance of the tire as does information molded on the tire and does not have to be removed as does information marked on a tire with crayon. Another very important advantage of the invention is that it is particularly adaptable to automatic control systems, commonly referred to as "automation."

Other objects and advantages of the invention will become apparent from the following description when read in injunction with the accompanying drawings wherein.

Figure 7:
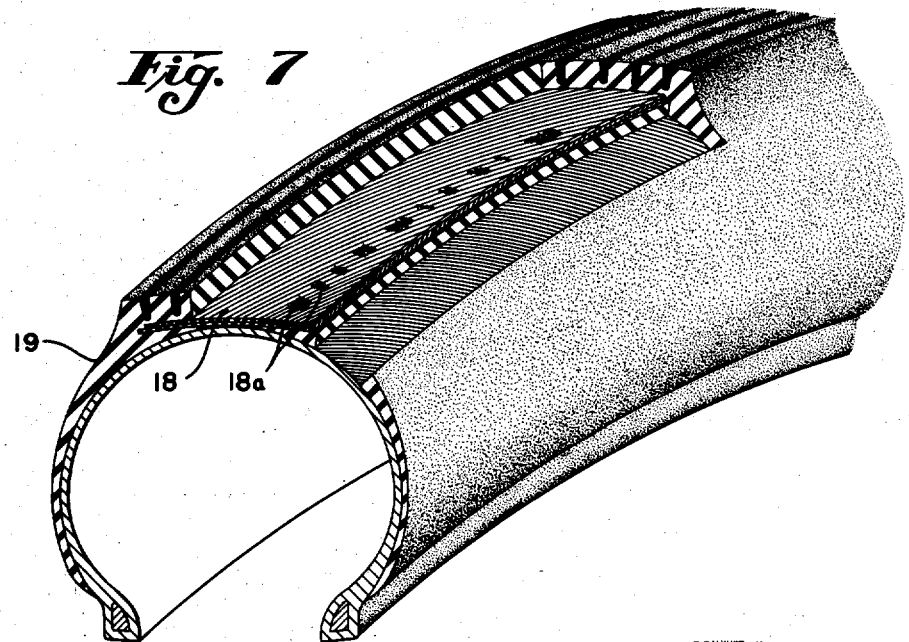
Figure 8:
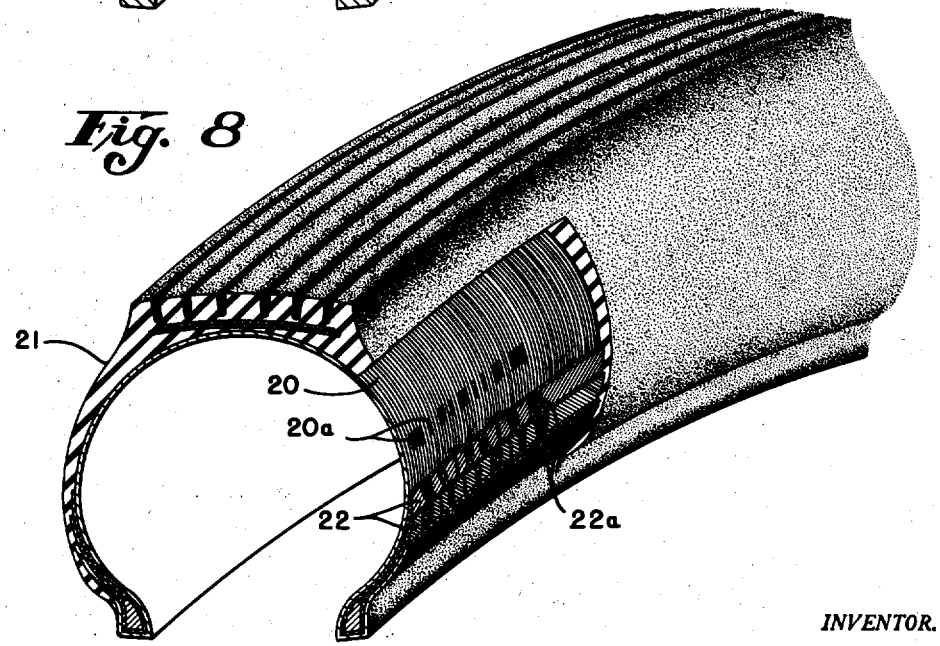

Fig. 7 is a sectional perspective view of a portion of a pneumatic tire showing a modification of the invention wherein a portion of the wire breaker of the tire is magnetized to provide coded information thereon; and Fig. 8 is a sectional perspective view of a portion of a pneumatic tire showing another modification of the invention wherein portions of the wire carcass and portions of the wire flipper of the tire are magnetized to provide coded information thereon.

Figure 1:
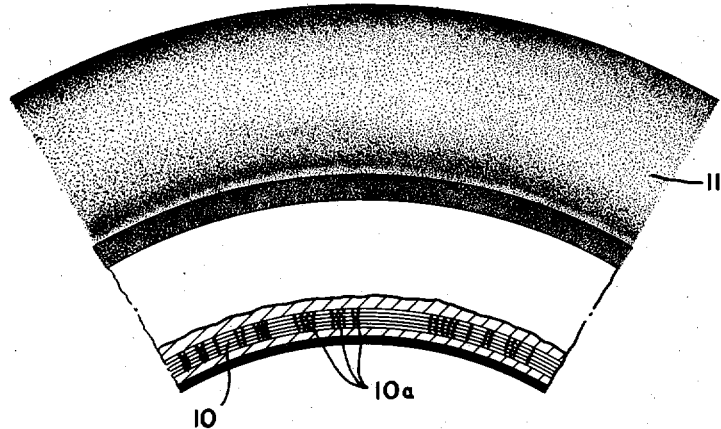
Fig. 1 is a side elevational view of a portion of a tire with the bead region broken away to show the bead wires magnetized in a predetermined pattern in accordance with the invention.

Referring to Fig. 1, the bead wire bundle 10 of a rubber pneumatic tire 11 is shown magnetized in a predetermined pattern in accordance with the invention. The magnetized areas of the ferrous bead wire bundle 10 (commonly high tensile carbon steel) of the tire 11 are shown as shaded areas 10a. In accordance with the invention, the spacing and length of the individual magnetized areas 10a are provided in accordance with a predetermined code so that the magnetized portions 10a represent the desired information.

Figure 2:
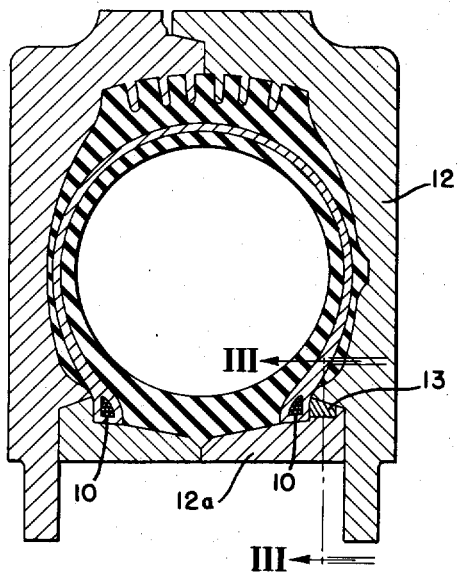
Fig. 2 is a cross-sectional view of a tire, curing bag, and mold showing magnets incorporated in the toe ring of the mold to thereby magnetize the bead wires in a predetermined pattern during curing of the tire.
Figure 3:
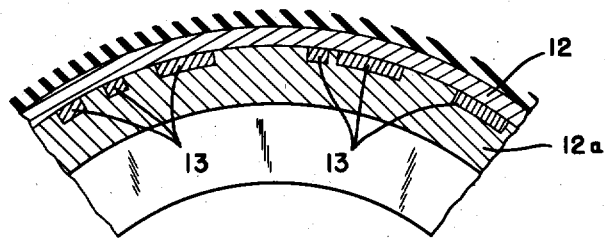
Fig. 3 is a sectional view taken on the line III—III of Fig. 2 showing an arrangement of magnets in the toe ring.

As shown in Figs. 2 and 3, the magnetic pattern in the bead wire bundle 10 may be provided during the molding of the tire by means of magnets 13 (either permanent or electro-magnets) which are carried by the usual toe rings 12a of a conventional mold 12. As shown in Fig. 3, the magnets 13 are of varying length and spacing in accordance with a predetermined code and the same magnetic pattern is induced in the bead wire 10 during the curing of the tire in the mold 12.

Figure 4:
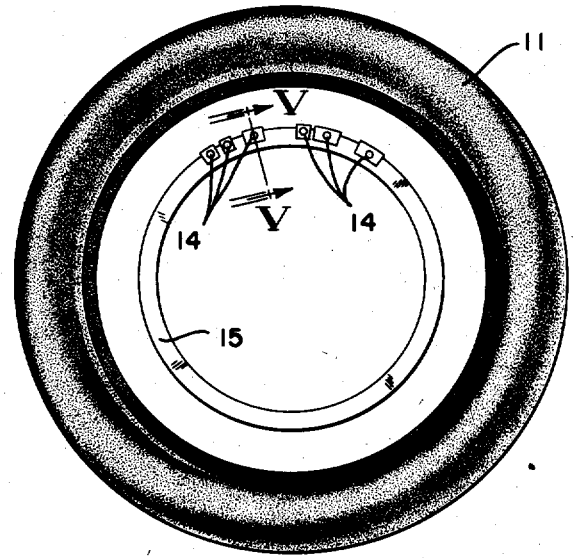
Fig. 4 is a plan view of a tire showing the magnetizing of the bead wires of the cured tire by means of electro-magnets adjustably mounted on a supporting ring.
Figure 5:
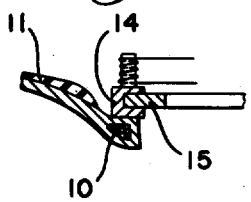
Fig. 5 is a sectional view taken on the line V—V of Fig. 4.

As shown in Figs. 4 and 5, the magnetizing of the bead wire bundle 10 may also be performed after the tire has been cured and removed from the tire mold. As best shown in Fig. 4, electro-magnets 14 of various lengths are slidably mounted on a ring 15 so that any desired code pattern can be set up. Once the pattern is set up, the electro-magnets are energized from an electrical source (not shown) to thereby magnetize the bead wire bundle 10 in the predetermined pattern. If desired, a suitable mechanism (not shown) controlled by a keyboard similar to that on a typewriter or a lino-type machine may be used for arranging and setting the magnets 14 in the desired pattern. If desired the same, or comparable mechanism may be employed for magnetizing the bead wire bundles before they are built into the tire.

Figure 6:
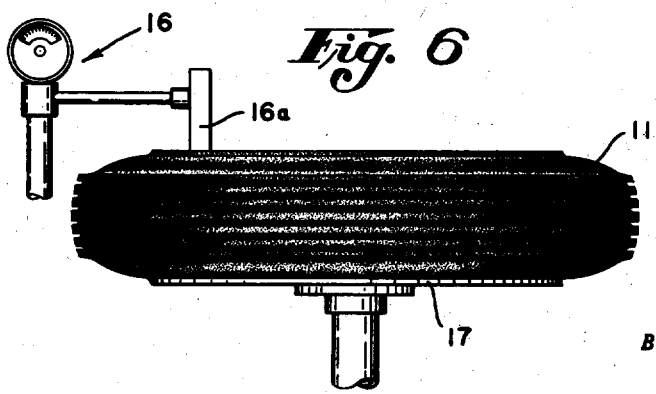
Fig. 6 is an elevational view of a tire and apparatus for transcribing the information or data from the previously magnetized bead wires of the tire.

As shown in Fig. 6, the magnetically recorded information on the bead wire bundle 10 of the tire may be transcribed by a suitable indicating or recording device 16 having a pick-up 16a positionable adjacent the magnetized bead of a tire to pick up the magnetic pattern as the tire 11 is rotated on a suitable turntable 17. In the simplest form, the pick-up may be a coil in which a varying current would be induced as the magnetized sections of the bead wires 10 pass thereby.

When a tire incorporates a breaker ply formed of ferrous metal or other magnetizable wire material as indicated at 18 in the tire 19 shown in Fig. 7, information may be magnetically recorded in accordance with the invention on the breaker, the beads, or both. The magnetized areas of the breaker 18 are shown as shaded areas 18a in Fig. 7.

When a tire incorporates body plies formed of ferrous metal or other magnetizable wire material as indicated at 20 in tire 21 shown in Fig. 8, information may be recorded, in accordance with the present invention, on the wire body plies, the beads, or both. The magnetized areas of the body plies 20 are shown as shaded areas 20a in Fig. 8. If flippers 22 formed of ferrous metal wire or other magnetizable material are employed in the tire, information may be recorded in accordance with the present invention, on the flippers. The magnetized areas of the flippers 22 are shown as shaded areas 22a. The magnetic pattern in the breaker 18 or in the body plies 20 or in the flippers 22 may be provided during molding by providing magnets in the wall of the mold. The magnetic pattern can of course, also be applied to the components before they are incorporated in the tire, or can be applied to the components after the tire has been cured.

From the above description it can be seen that there is provided a novel method of recording information on a tire. Unlike other methods heretofore used, the information is invisible and therefore does not detract from the appearance of the tire. The information being recorded magnetically, the tire with its magnetized components can be used to activate electrical and electro-mechanical automatic control systems for performing various operations with respect to the tire.

This application is a continuation-in-part of my co-pending application Serial No. 574,450, filed March 28, 1956.

Having thus described my invention, what I claim and desire to protect by Letters Patent is:

1. Apparatus for recording information on a pneumatic tire comprising a tire mold having a bead forming portion, a plurality of magnets in said bead forming portion, said magnets being arranged in a predetermined pattern in accordance with a predetermined code of said information whereby the bead wires of a tire molded therein will be magnetized in said predetermined pattern.

2. The method of recording relevant information on a pneumatic tire having bead wires forming a permanent structural element thereof comprising, magnetizing portions of the bead wires in a predetermined pattern in accordance with a predetermined code of said information relating to said tire, after the tire has been molded.

3. The method of recording relevant information on a pneumatic tire having bead wires forming a structural component thereof comprising, magnetizing the bead wires in a predetermined pattern in accordance with a predetermined code of said information relating to said tire, and then incorporating the bead wires in the tire during the fabrication of the tire.

4. The method of recording relevant information on a pneumatic tire having a bead wire member forming a structural element of the tire comprising, magnetizing portions of the bead wire member in a predetermined pattern in accordance with a predetermined code of said information relating to said tire, during manufacture of the tire.

5. A tire having a bead wire member forming a permanent structural element thereof which is magnetized in a predetermined pattern during manufacture of the tire to provide coded data thereon relating to the tire.

6. A tire having a bead portion comprising a ferrous metal bead wire member forming a component of said tire, portions of said bead wire member being magnetized in indicia forming patterns relating to the tire, during manufacture of the tire.

7. A pneumatic tire provided with bead wire members forming permanent structural elements of the tire, said bead wire members comprising a metal susceptible of being magnetized, at least one of said bead wire members being magnetized in an indicia forming pattern relating to the tire.

8. A conventional pneumatic tire comprising a tread, sidewalls, a body, and magnetizable metallic bead wire members to which the reinforcing elements of said body are anchored, said tire being characterized by having at least one of its bead wire members magnetized in an indicia forming pattern to provide coded information thereon relating to the tire.

9. The method of recording relevant information on a pneumatic tire having magnetizable metallic bead wire members which form permanent structural elements of the tire comprising, magnetizing at least one of said bead wire members in an indicia forming pattern to provide coded information thereon relating to said tire.

10. A pneumatic tire provided with a breaker forming a permanent structural element of the tire, said breaker comprising a metal susceptible of being magnetized, at least a portion of said breaker being magnetized in an indicia forming pattern relating to the tire.

11. A pneumatic tire provided with a body ply forming a permanent structural element of the tire, said body ply comprising a metal susceptible of being magnetized, at least a portion of said body ply being magnetized in an indicia forming pattern relating to the tire.

12. A pneumatic tire provided with flippers forming permanent structural elements of the tire, said flippers comprising a metal susceptible of being magnetized, at least one of said flippers being magnetized in an indicia forming pattern relating to the tire.

No references cited.